United States Patent
Murakawa et al.

(10) Patent No.: US 12,448,663 B2
(45) Date of Patent: Oct. 21, 2025

(54) METHOD FOR MANUFACTURING NON-ORIENTED ELECTRICAL STEEL SHEET

(71) Applicant: NIPPON STEEL CORPORATION, Tokyo (JP)

(72) Inventors: Tesshu Murakawa, Tokyo (JP); Hiroshi Fujimura, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 713 days.

(21) Appl. No.: 17/641,628

(22) PCT Filed: Nov. 13, 2020

(86) PCT No.: PCT/JP2020/042471
§ 371 (c)(1),
(2) Date: Mar. 9, 2022

(87) PCT Pub. No.: WO2021/095859
PCT Pub. Date: May 20, 2021

(65) Prior Publication Data
US 2022/0396846 A1    Dec. 15, 2022

(30) Foreign Application Priority Data
Nov. 15, 2019 (JP) ................. 2019-206630
Nov. 15, 2019 (JP) ................. 2019-206812

(51) Int. Cl.
| | |
|---|---|
| C21D 9/46 | (2006.01) |
| C21D 6/00 | (2006.01) |
| C21D 8/00 | (2006.01) |
| C21D 8/12 | (2006.01) |
| C22C 38/00 | (2006.01) |
| C22C 38/02 | (2006.01) |
| C22C 38/04 | (2006.01) |
| C22C 38/06 | (2006.01) |
| C22C 38/10 | (2006.01) |
| C22C 38/16 | (2006.01) |
| H01F 1/147 | (2006.01) |

(52) U.S. Cl.
CPC .............. *C21D 9/46* (2013.01); *C21D 6/001* (2013.01); *C21D 6/005* (2013.01); *C21D 6/007* (2013.01); *C21D 6/008* (2013.01); *C21D 8/005* (2013.01); *C21D 8/1222* (2013.01); *C21D 8/1233* (2013.01); *C21D 8/1266* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/105* (2013.01); *C22C 38/16* (2013.01); *H01F 1/14775* (2013.01); *C22C 2202/02* (2013.01)

(58) Field of Classification Search
CPC ....................................................... C21D 6/008
See application file for complete search history.

(56) References Cited

U.S. PATENT DOCUMENTS

| | | | |
|---|---|---|---|
| 2017/0044641 A1* | 2/2017 | Fortunati | ............... C22C 38/004 |
| 2017/0194082 A1 | 7/2017 | Murakami et al. | |
| 2018/0030558 A1 | 2/2018 | Okubo et al. | |
| 2018/0202021 A1 | 7/2018 | Oda et al. | |
| 2019/0382867 A1 | 12/2019 | Zaizen et al. | |

FOREIGN PATENT DOCUMENTS

| | | | | |
|---|---|---|---|---|
| CN | 107208171 A | | 9/2017 | |
| EP | 3 214 195 A1 | | 9/2017 | |
| JP | 2001107202 A | * | 4/2001 | |
| JP | 4029430 B2 | | 1/2008 | |
| JP | 2017-193731 A | | 10/2017 | |
| JP | 6319465 B2 | | 5/2018 | |
| KR | 10-2014-0084895 A | | 7/2014 | |
| WO | WO-2013080891 A1 | * | 6/2013 | ............... B21B 3/02 |
| WO | WO 2015/170271 A1 | | 11/2015 | |
| WO | WO 2018/179871 A1 | | 10/2018 | |

OTHER PUBLICATIONS

English machine translation of JP-2001107202-A (Year: 2001).*
English machine translation of WO-2013080891-A1 (Year: 2013).*

* cited by examiner

*Primary Examiner* — Jophy S. Koshy
*Assistant Examiner* — Joshua S Carpenter
(74) *Attorney, Agent, or Firm* — Birch, Stewart, Kolasch & Birch, LLP

(57) ABSTRACT

A method for manufacturing a non-oriented electrical steel sheet includes a step of performing hot rolling on a steel material having a predetermined chemical composition, a step of performing first cold rolling, a step of performing process annealing, a step of performing second cold rolling, and a step of performing any one or both of final annealing and stress relief annealing. A final pass of finish rolling is performed in a temperature range equal to or higher than an Ar1 temperature, the steel sheet is held for 2 hours or less in a temperature range lower than an Ac1 temperature in the final annealing, and the steel sheet is held for 1200 sec or more in a temperature range equal to or higher than 600° C. and lower than the Ac1 temperature in the stress relief annealing.

10 Claims, No Drawings

METHOD FOR MANUFACTURING NON-ORIENTED ELECTRICAL STEEL SHEET

TECHNICAL FIELD OF THE INVENTION

The present invention relates to a method for manufacturing a non-oriented electrical steel sheet.

Priority is claimed on Japanese Patent Application No. 2019-206630, filed Nov. 15, 2019 and Japanese Patent Application No. 2019-206812, filed Nov. 15, 2019, the contents of which are incorporated herein by reference.

RELATED ART

A non-oriented electrical steel sheet is used for, for example, a core of a motor. A non-oriented electrical steel sheet is required to have excellent magnetic characteristics on an average in all directions parallel to the sheet surface of the non-oriented electrical steel sheet (hereinafter, referred to as "whole circumferential average (omnidirectional average) in a sheet surface") and to have, for example, a low iron loss and high magnetic flux density.

Although various techniques have been proposed so far, it is difficult to obtain sufficient magnetic characteristics on the whole circumferential average in a sheet surface. For example, even if sufficient magnetic characteristics can be obtained in a specific direction present in a sheet surface, sufficient magnetic characteristics may not be obtained in other directions.

PRIOR ART DOCUMENT

Patent Document

[Patent Document 1] Japanese Patent No. 4029430
[Patent Document 2] Japanese Patent No. 6319465

DISCLOSURE OF THE INVENTION

Problems to be Solved by the Invention

The invention has been made in consideration of the above-mentioned problems, and an object of the invention is to provide a method for manufacturing a non-oriented electrical steel sheet that can obtain excellent magnetic characteristics on the whole circumferential average (omnidirectional average) in a sheet surface.

Further, in order to reduce production cost, it is preferable that a non-oriented electrical steel sheet is made of a material to be easily worked in a case where the non-oriented electrical steel sheet is to be worked for a core of a motor. Accordingly, an object of the invention is to preferably provide a non-oriented electrical steel sheet that can obtain excellent magnetic characteristics on the whole circumferential average (omnidirectional average) and is excellent in workability.

Means for Solving the Problem

The inventors have made diligent studies to solve the above-mentioned problems. As a result, the inventors have founded out as follows. For the manufacture of a non-oriented electrical steel sheet that can obtain excellent magnetic characteristics on the whole circumferential average in a sheet surface, it is important to premise a chemical composition of an α-γ transformation system, to refine crystal structure by transformation into ferrite from austenite during hot rolling, to perform first cold rolling at a desired cumulative rolling reduction, to cause {100} grains, which are less likely to be grown normally, to be likely to be grown by performing process annealing under desired conditions and causing projection recrystallization (hereinafter, referred to as bulging) to occur, and to cause 11001 grains to encroach {111} grains by performing second cold rolling (skin pass rolling) and final annealing or stress relief annealing under desired conditions.

The gist of the invention made based on the above-mentioned findings is as follows.

(1) A method for manufacturing a non-oriented electrical steel sheet according to an aspect of the invention includes: a step of obtaining a hot-rolled steel sheet by performing hot rolling on a steel material and winding the steel material in a temperature range higher than 250° C. and equal to or lower than 550° C., the steel material having a chemical composition that contains, by mass %, 0.0100% or less of C, 1.50 to 4.00% of Si, 0.0001 to 1.000% of sol.Al, 0.0100% or less of S, 0.0100% or less of N, 2.50 to 5.00% of Mn, Ni, Co, Pt, Pb, Cu, and Au in total, 0.000 to 0.400% of Sn, 0.000 to 0.400% of Sb, 0.000 to 0.400% of P, and 0.0000 to 0.0100% of Mg, Ca, Sr, Ba, Ce, La, Nd, Pr, Zn, and Cd in total with a remainder of Fe and impurities, and satisfies the following Expression (1) in a case where, by mass %, a Mn content is denoted by [Mn], a Ni content is denoted by [Ni], a Co content is denoted by [Co], a Pt content is denoted by [Pt], a Pb content is denoted by [Pb], a Cu content is denoted by [Cu], an Au content is denoted by [Au], a Si content is denoted by [Si], and a sol.Al content is denoted by [sol.Al]; a step of performing first cold rolling on the hot-rolled steel sheet; a step of performing process annealing after the first cold rolling; a step of performing second cold rolling after the process annealing; and a step of performing any one or both of final annealing and stress relief annealing after the second cold rolling. A final pass of finish rolling during the hot rolling is performed in a temperature range equal to or higher than an Ar1 temperature, the steel sheet is held for 2 hours or less in a temperature range lower than an Ac1 temperature in the final annealing, and the steel sheet is held for 1200 sec or more in a temperature range equal to or higher than 600° C. and lower than the Ac1 temperature in the stress relief annealing.

$$([Mn]+[Ni]+[Co]+[Pt]+[Pb]+[Cu]+[Au])-([Si]+[sol.Al])>0.00\% \quad (1)$$

(2) In the method for manufacturing a non-oriented electrical steel sheet according to (1), the steel material may contain one or more selected from the group consisting of, by mass %, 0.020 to 0.400% of Sn, 0.020 to 0.400% of Sb, 0.020 to 0.400% of P, and 0.0005 to 0.0100% of Mg, Ca, Sr, Ba, Ce, La, Nd, Pr, Zn, and Cd in total.

(3) In the method for manufacturing a non-oriented electrical steel sheet according to (1) or (2), the steel sheet may be held for 10 to 1200 sec in a temperature range equal to or higher than 600° C. and lower than the Ac1 temperature in the final annealing.

(4) In the method for manufacturing a non-oriented electrical steel sheet according to any one of (1) to (3), the steel sheet may be held for 1 hour or more in a temperature range equal to or higher than 750° C. and lower than the Ac1 temperature in the stress relief annealing.

(5) In the method for manufacturing a non-oriented electrical steel sheet according to any one of (1) to (4), cold rolling may be performed at a cumulative rolling reduction of 80 to 92% in the step of performing the first cold rolling, and cold rolling may be performed at a cumulative rolling reduction of 5 to 25% in the step of performing the second cold rolling.

(6) In the method for manufacturing a non-oriented electrical steel sheet according to any one of (1) to (5), the process annealing may be performed in a temperature range lower than the Ac1 temperature.

(7) In the method for manufacturing a non-oriented electrical steel sheet according to any one of (1) to (6), both the final annealing and the stress relief annealing may be performed.

Effects of the Invention

According to the aspect of the invention, it is possible to provide a method for manufacturing a non-oriented electrical steel sheet that can obtain excellent magnetic characteristics on the whole circumferential average (omnidirectional average) in a sheet surface.

According to the preferred aspect of the invention, it is possible to provide a non-oriented electrical steel sheet that can obtain excellent magnetic characteristics on the whole circumferential average (omnidirectional average) and is excellent in workability.

EMBODIMENTS OF THE INVENTION

An embodiment of the invention will be described in detail below. However, the invention is not limited to only configuration disclosed in this embodiment, and can have various modifications without departing from the scope of the invention.

First, the chemical composition of a steel material used in a method for manufacturing a non-oriented electrical steel sheet according to this embodiment (which may be simply referred to as a steel material according to this embodiment) and a non-oriented electrical steel sheet manufactured by the method for manufacturing a non-oriented electrical steel sheet according to this embodiment (which may be simply referred to as a non-oriented electrical steel sheet according to this embodiment) will be described. In the following description, "%", which is a unit of the content of each element contained in the non-oriented electrical steel sheet or the steel material, means "mass %" unless otherwise noted. A limited numerical range described below using "to" includes a lower limit and an upper limit. Numeral values represented using "less than" or "exceed" are not included in a numerical range.

The non-oriented electrical steel sheet and the steel material according to this embodiment have a chemical composition in which ferrite-austenite transformation (hereinafter, referred to as α-γ transformation) may occur. Specifically, the non-oriented electrical steel sheet and the steel material according to this embodiment have a chemical composition that contains, by mass %, 0.0100% or less of C, 1.50 to 4.00% of Si, 0.0001 to 1.000% of sol.Al, 0.0100% or less of S, 0.0100% or less of N, 2.50 to 5.00% of Mn, Ni, Co, Pt, Pb, Cu, and Au in total, 0.000 to 0.400% of Sn, 0.000 to 0.400% of Sb, 0.000 to 0.400% of P, and 0.0000 to 0.0100% of Mg, Ca, Sr, Ba, Ce, La, Nd, Pr, Zn, and Cd in total with a remainder of Fe and impurities. Further, the Mn content, the Ni content, the Co content, the Pt content, the Pb content, the Cu content, the Au content, the Si content, and the sol.Al content satisfy predetermined conditions to be described later.

(0.0100% or Less of C)

C increases the iron loss of the non-oriented electrical steel sheet, or causes magnetic aging. Accordingly, it is more preferable that the C content is lower. Such a phenomenon is remarkable in a case where the C content exceeds 0.0100%. For this reason, the C content is set to 0.0100% or less. A reduction in the C content also contributes to the uniform improvement of the magnetic characteristics on the whole circumferential average in a sheet surface. For this reason, the C content is preferably 0.0060% or less, more preferably 0.0040% or less, and still more preferably 0.0020% or less.

The lower limit of the C content is not particularly limited, but it is preferable that the lower limit of the C content is set to 0.0005% or more on the basis of the cost of decarburization treatment during refining.

(1.50 to 4.00% of Si)

Si reduces an eddy-current loss and reduces the iron loss of the non-oriented electrical steel sheet by increasing electric resistance, or improves workability during punching in a core by increasing a yield ratio. In a case where the Si content is less than 1.50%, these effects cannot be sufficiently obtained. Accordingly, the Si content is set to 1.50% or more. The Si content is preferably 2.00% or more and more preferably 2.50% or more.

On the other hand, in a case where the Si content exceeds 4.00%, the magnetic flux density of the non-oriented electrical steel sheet is reduced, workability during punching is reduced due to an excessive increase in hardness, or it is difficult for cold rolling to be performed. Accordingly, the Si content is set to 4.00% or less. The Si content is preferably 3.50% or less and more preferably 3.30% or less.

(0.0001 to 1.000% of sol.Al)

sol.Al reduces an eddy-current loss and reduces the iron loss of the non-oriented electrical steel sheet by increasing electric resistance. sol.Al also contributes to the improvement of the relative magnitude of magnetic flux density B50 with respect to the saturated magnetic flux density. Here, the magnetic flux density B50 is magnetic flux density in a magnetic field of 5000 A/m. In a case where the sol.Al content is less than 0.0001%, these effects cannot be sufficiently obtained. Further, Al also has a desulfurization-promoting effect during the manufacture of steel. Accordingly, the sol.Al content is set to 0.0001% or more. The sol.Al content is preferably 0.005% or more, more preferably exceeds 0.100%, even more preferably 0.200% or more, and still more preferably 0.300% or more.

On the other hand, in a case where the sol.Al content exceeds 1.000%, the magnetic flux density of the non-oriented electrical steel sheet is reduced or a yield ratio is reduced, so that workability during punching is reduced. Accordingly, the sol.Al content is set to 1.000% or less. The sol.Al content is preferably 0.500% or less and more preferably 0.400% or less.

In this embodiment, the sol.Al means acid-soluble Al and indicates solute Al that is present in steel in the state of a solid solution.

(0.0100% or Less of S)

S is not an essential element to be contained and is, for example, an element that is contained in steel as an impurity. S inhibits recrystallization and grain growth during annealing due to the precipitation of fine MnS. In a case where recrystallization and grain growth are inhibited, the iron loss of the non-oriented electrical steel sheet is increased and magnetic flux density is reduced. Accordingly, it is more preferable that the S content is lower. An increase in iron loss and a reduction in magnetic flux density, which are caused by the inhibition of the recrystallization and the grain growth, are remarkable in a case where the S content exceeds 0.0100%. For this reason, the S content is set to 0.0100% or less. The S content is preferably 0.0060% or less and more preferably 0.0040% or less.

The lower limit of the S content is not particularly limited, but it is preferable that the lower limit of the S content is set to 0.0003% or more on the basis of the cost of desulfurization treatment during refining.

(0.0100% or Less of N)

Since N causes the magnetic characteristics of the non-oriented electrical steel sheet to deteriorate like C, it is more preferable that the N content is lower. Accordingly, the N content is set to 0.0100% or less. The N content is preferably 0.0050% or less and more preferably 0.0030% or less.

The lower limit of the N content is not particularly limited, but it is preferable that the lower limit of the N content is set to 0.0010% or more on the basis of the cost of denitrification treatment during refining.

(2.50 to 5.00% of Mn, Ni, Co, Pt, Pb, Cu, and Au in Total)

Since Mn, Ni, Co, Pt, Pb, Cu, and Au are elements required to cause α-γ transformation to occur, 2.50% or more of at least one of these elements is contained. All of these elements do not need to be contained, and the content of any one of them has only to be 2.50% or more. The total content of these elements is preferably 3.00% or more.

On the other hand, in a case where the total content of these elements exceeds 5.00%, cost is increased and the magnetic flux density of the non-oriented electrical steel sheet may be reduced. Accordingly, the total content of these elements is set to 5.00% or less. The total content of these elements is preferably 4.50% or less.

The total of Mn, Ni, Co, Pt, Pb, Cu, and Au is obtained from the calculation of the total value of the contents of Mn, Ni, Co, Pt, Pb, Cu, and Au.

The non-oriented electrical steel sheet and the steel material according to this embodiment have a chemical composition further satisfying the following conditions as conditions in which α-γ transformation may occur. That is, in a case where the Mn content (mass %) is denoted by [Mn], the Ni content (mass %) is denoted by [Ni], the Co content (mass %) is denoted by [Co], the Pt content (mass %) is denoted by [Pt], the Pb content (mass %) is denoted by [Pb], the Cu content (mass %) is denoted by [Cu], the Au content (mass %) is denoted by [Au], the Si content (mass %) is denoted by [Si], and the sol.Al content (mass %) is denoted by [sol.Al], the following Expression (1) is satisfied.

$$([Mn]+[Ni]+[Co]+[Pt]+[Pb]+[Cu]+[Au])-([Si]+[sol.Al])>0.00\% \quad (1)$$

Since α-γ transformation does not occur in a case where Expression (1) having been described above is not satisfied, the magnetic flux density of the non-oriented electrical steel sheet is reduced. For this reason, the left side of Expression (1) exceeds 0.00%. The left side of Expression (1) is preferably 0.30% or more and more preferably 0.50% or more.

The upper limit of the left side of Expression (1) is not particularly limited, but may be 2.00% or less or 1.00% or less.

The remainder of the chemical composition of the non-oriented electrical steel sheet and the steel material according to this embodiment consists of Fe and impurities. Materials that are contained in raw materials, such as ore and scrap; materials that are contained in a manufacturing step; or materials that are allowed in a range where the characteristics of the non-oriented electrical steel sheet manufactured by the method for manufacturing a non-oriented electrical steel sheet according to this embodiment is not adversely affect are exemplified as the impurities.

The non-oriented electrical steel sheet and the steel material according to this embodiment may contain the following elements as optional elements in addition to a part of Fe. The lower limit of the content in a case where the optional elements are not contained is 0%. The details of each optional element will be described below.

(0.000 to 0.400% of Sn, 0.000 to 0.400% of Sb, and 0.000 to 0.400% of P)

Sn and Sb improve the magnetic flux density of the non-oriented electrical steel sheet by improving a texture subjected to cold rolling and recrystallization. For this reason, these elements may be contained as necessary. In order to reliably obtain the effect, it is preferable that the content of even one of Sn and Sb is set to 0.020% or more. On the other hand, in a case where Sn and Sb are excessively contained, steel is embrittled. Accordingly, each of the Sn content and the Sb content is set to 0.400% or less.

Further, P may be contained to ensure the hardness of a steel sheet subjected to recrystallization. In order to reliably obtain this effect, it is preferable that the P content is set to 0.020% or more. On the other hand, in a case where P is excessively contained, the embrittlement of steel is caused. Accordingly, the P content is set to 0.400% or less.

(0.0000 to 0.0100% of Mg, Ca, Sr, Ba, Ce, La, Nd, Pr, Zn, and Cd in Total)

Mg, Ca, Sr, Ba, Ce, La, Nd, Pr, Zn, and Cd react with S contained in molten steel during the casting of the molten steel, and create sulfide and/or oxysulfide. Hereinafter, Mg, Ca, Sr, Ba, Ce, La, Nd, Pr, Zn, and Cd may be collectively referred to as "coarse precipitate forming elements".

The grain size of the precipitates of the coarse precipitate forming elements is in the range of about 1 to 2 μm, and is much larger than the grain sizes (about 100 nm) of fine precipitates, such as MnS, TiN, or AlN. These fine precipitates adhere to the precipitates of the coarse precipitate forming elements, and are less likely to inhibit recrystallization and grain growth during annealing, such as process annealing. In order to sufficiently obtain these effects, it is preferable that the total of the coarse precipitate forming elements is 0.0005% or more. In order to sufficiently obtain the above-mentioned action, all of Mg, Ca, Sr, Ba, Ce, La, Nd, Pr, Zn, and Cd do not need to be contained and it is preferable that the content of any one of them is 0.0005% or more.

On the other hand, in a case where the total of the coarse precipitate forming elements exceeds 0.0100%, a total amount of sulfide and/or oxysulfide is excessive and recrystallization and grain growth during annealing, such as process annealing, are inhibited. Accordingly, the total content of the coarse precipitate forming elements is set to 0.0100% or less.

The total content of Mg, Ca, Sr, Ba, Ce, La, Nd, Pr, Zn, and Cd is obtained from the calculation of the total value of the contents of Mg, Ca, Sr, Ba, Ce, La, Nd, Pr, Zn, and Cd.

The chemical composition of the non-oriented electrical steel sheet and the steel material according to this embodiment may be measured by a general analysis method. For example, the chemical composition of the non-oriented electrical steel sheet and the steel material according to this embodiment may be measured using inductively coupled plasma-atomic emission spectrometry (ICP-AES) or optical emission spectroscopy (OES). C and S may be measured using a combustion-infrared absorption method, and N may be measured using an inert gas fusion-thermal conductivity method. sol.Al may be measured by ICP-AES using a filtrate that is obtained in a case where a sample is decomposed with an acid by heating.

Next, the texture of the non-oriented electrical steel sheet according to this embodiment will be described. The details of a manufacturing method will be described later, but the non-oriented electrical steel sheet according to this embodiment has a chemical composition in which α-γ transformation may occur and has a structure in which {100} grains have grown since a structure is refined by final annealing or stress relief annealing performed under desired conditions through first cold rolling, process annealing, and second cold rolling (skin pass rolling). Accordingly, for example, {100}<011> orientation integrated intensity of the non-oriented electrical steel sheet according to this embodiment is 5 or more, and the magnetic flux density B50 thereof in a direction inclined with respect to a rolling direction by 45° is particularly increased. In the non-oriented electrical steel sheet according to this embodiment, magnetic flux density is increased in a specific direction as described above but high magnetic flux density is obtained on the whole circumferential average in a sheet surface. In a case where {100}<011> orientation integrated intensity is less than 5, {111}<112> orientation integrated intensity reducing magnetic flux density is increased. As a result, magnetic flux density is reduced as a whole.

{100}<011> orientation integrated intensity can be measured by an X-ray diffraction method or an electron backscatter diffraction (EBSD) method. Since the angles of reflection and the like of X-rays and electron beams from a sample vary depending on each crystal orientation, crystal orientation intensity can be obtained from the reflection intensity or the like on the basis of a random orientation sample.

Next, the magnetic characteristics of the non-oriented electrical steel sheet according to this embodiment will be described. The magnetic characteristics of the non-oriented electrical steel sheet according to this embodiment are most excellent in two directions in which a smaller one of angles formed between the rolling direction and each of the two directions is 45°. On the other hand, the magnetic characteristics are worst in two directions in which angles formed between the rolling direction and the two directions are 0° and 90°. Here, 45° is a theoretical value, and it may not be easy to make the smaller one of the angles coincide with 45° in actual manufacturing. Accordingly, theoretically, in a case where directions in which the magnetic characteristics are most excellent are two directions in which a smaller one of angles formed between the rolling direction and each of the two directions is 45°, 45° also includes an angle that does not (exactly) coincides with 45° in an actual non-oriented electrical steel sheet. The same applies to the cases of 0° and 90°.

Further, the magnetic characteristics in the two directions in which the magnetic characteristics are most excellent are theoretically the same, but it may not be easy to make the magnetic characteristics in the two directions be the same in actual manufacturing. Accordingly, theoretically, in a case where the magnetic characteristics in the two directions in which the magnetic characteristics are most excellent are the same, "the same" also includes a case where the magnetic characteristics are not (exactly) the same. The same applies to the cases of two directions in which the magnetic characteristics are worst.

The above-mentioned angles are expressed to have positive values even in both a clockwise direction and a counterclockwise direction. In a case where the clockwise direction is defined as a negative direction and the counterclockwise direction is defined as a positive direction, the two directions in which a smaller one of angles formed between the above-mentioned rolling direction and each of the two directions is 45° are two directions in which angles, which have smaller absolute values, of angles formed between the above-mentioned rolling direction and the two directions are 45° and −45°.

The two directions in which a smaller one of angles formed between the above-mentioned rolling direction and each of the two directions is 45° can also be expressed as two directions in which angles formed between the rolling direction and the two directions are 45° and 135°.

In a case where the magnetic flux density of the non-oriented electrical steel sheet according to this embodiment is measured, the magnetic flux density B50 in a direction inclined with respect to the rolling direction by 45° is 1.700 T or more. Further, the magnetic flux density B50 on the whole circumferential average (omnidirectional average) in a sheet surface is 1.650 T or more. In the non-oriented electrical steel sheet according to this embodiment, the magnetic flux density in a direction inclined with respect to the rolling direction by 45° is high but high magnetic flux density is obtained even on the whole circumferential average (omnidirectional average) in a sheet surface.

Samples of 55 mm square are cut out from the non-oriented electrical steel sheet in directions inclined with respect to the rolling direction by 45°, 0°, and the like and magnetic flux densities in a magnetic field of 5000 A/m are measured using a single-sheet magnetic measurement device, so that the magnetic flux density B50 is obtained. The magnetic flux density B50 on the whole circumferential average (omnidirectional average) is obtained from the calculation of the average value of the magnetic flux densities in directions that are inclined with respect to the rolling direction by 0°, 45°, 90°, and 135°.

An iron loss W10/400 is changed depending on the sheet thickness of the non-oriented electrical steel sheet. The iron loss W10/400 is reduced as the sheet thickness of the non-oriented electrical steel sheet is reduced.

In a case where the sheet thickness of the non-oriented electrical steel sheet according to this embodiment is in the range of 0.30 to 0.40 mm, the iron loss W10/400 is 20.00 W/kg or less. In a case where stress relief annealing to be described later is performed, the iron loss W10/400 is further reduced. As a result, in a case where the sheet thickness is in the range of 0.30 to 0.40 mm, the iron loss W10/400 becomes 15.20 W/kg or less.

Energy losses (W/kg) of the samples, which are obtained from the non-oriented electrical steel sheet, on the whole circumferential average, which are generated in a case where an AC magnetic field having a frequency of 400 Hz is applied so that the maximum magnetic flux density is 1.0 T, are measured using a single-sheet magnetic measurement device, so that iron losses W10/400 are obtained.

Next, the method for manufacturing a non-oriented electrical steel sheet according to this embodiment will be described. In the method for manufacturing a non-oriented electrical steel sheet according to this embodiment, hot rolling, first cold rolling, process annealing, second cold rolling (skin pass rolling), and any one or both of final annealing and stress relief annealing are performed.

Specifically, the method for manufacturing a non-oriented electrical steel sheet according to this embodiment includes: a step of obtaining a hot-rolled steel sheet by performing hot rolling on a steel material having the above-mentioned chemical composition and winding the steel material in a temperature range higher than 250° C. and equal to or lower than 550° C.; a step of performing first cold rolling on the hot-rolled steel sheet; a step of performing process annealing after the first cold rolling; a step of performing second cold rolling after the process annealing; and a step of performing any one or both of final annealing and stress relief annealing after the second cold rolling. A final pass of finish rolling during the hot rolling is performed in a temperature range equal to or higher than an Ar1 temperature, the steel sheet is held for 2 hours or less in a temperature range lower than an Ac1 temperature in the final annealing, and the steel sheet is held for 1200 sec or more in a temperature range equal to or higher than 600° C. and lower than the Ac1 temperature in the stress relief annealing.

In the method for manufacturing a non-oriented electrical steel sheet according to this embodiment, the steel sheet may be held for 10 to 1200 sec in a temperature range equal to or higher than 600° C. and lower than the Ac1 temperature in the final annealing.

Further, the steel sheet may be held for 1 hour or more in a temperature range equal to or higher than 750° C. and lower than the Ac1 temperature in the stress relief annealing.

In the method for manufacturing a non-oriented electrical steel sheet according to this embodiment, cold rolling may be performed at a cumulative rolling reduction of 80 to 92% in the step of performing the first cold rolling, and cold rolling may be performed at a cumulative rolling reduction of 5 to 25% in the step of performing the second cold rolling.

In the method for manufacturing a non-oriented electrical steel sheet according to this embodiment, the process annealing may be performed in a temperature range lower than the Ac1 temperature.

In the method for manufacturing a non-oriented electrical steel sheet according to this embodiment, both the final annealing and the stress relief annealing may be performed.

The details of each step will be described below.

First, a steel material having the above-mentioned chemical composition is heated and the hot rolling is performed. The steel material is a slab that is manufactured by, for example, normal continuous casting. The rough rolling and finish rolling of the hot rolling are performed in a temperature range of a γ range (equal to or higher than the Ar1 temperature). That is, the hot rolling is performed so that the finishing temperature of the finish rolling (the exit-side temperature of the final pass) is equal to or higher than the Ar1 temperature. Accordingly, austenite is transformed into ferrite by subsequent cooling, and crystal structure is refined. In a case where cold rolling is performed in a state where the crystal structure is refined, bulging is likely to occur and {100} grains, which are less likely to be grown normally, can be easily grown. The upper limit of the finishing temperature is not particularly limited, but may be set to, for example, 950° C. or less.

The heating temperature of the steel material may be set in the range of, for example, 1100 to 1250° C. so that the finishing temperature of the finish rolling is equal to or higher than the Ar1 temperature.

Further, in this embodiment, the winding is performed in a temperature range that is higher than 250° C. and equal to or lower than 550° C. The winding is performed in a temperature range is preferably 530° C. or less, more preferably 500° C. or less, and even more preferably 480° C. or less. In a case where the steel material is cooled to a temperature range equal to or lower than 550° C., transformation into ferrite from austenite is completed.

In a case where a winding temperature is 250° C. or less, recrystallization does not occur during the winding and processed grains remain. Accordingly, crystal structure is not refined. For this reason, the above-mentioned winding temperature is set to a temperature range higher than 250° C. The above-mentioned winding temperature is preferably 300° C. or more or 400° C. or more.

After that, a coil may be rewound and pickling may be performed as necessary. After the coil is rewound or after pickling is performed, the first cold rolling is performed on the hot-rolled steel sheet.

It is preferable that a cumulative rolling reduction is set in the range of 80 to 92% in the first cold rolling. As a cumulative rolling reduction is higher, {100} grains are more likely to be grown by subsequent bulging but it is difficult to wind the hot-rolled steel sheet. For this reason, an operation is likely to be difficult to be performed. In a case where a cumulative rolling reduction in the first cold rolling is set in the above-mentioned range, the growth of {100} grains, which is due to the subsequent bulging, can be preferably controlled.

The cumulative rolling reduction mentioned here is represented by $(1-t_1/t_0) \times 100(\%)$ using a sheet thickness to of the hot-rolled steel sheet that is not yet subjected to the first cold rolling and a sheet thickness $t_1$ of the steel sheet (cold-rolled steel sheet) that has been subjected to the first cold rolling.

The process annealing is performed after the first cold rolling. In this embodiment, it is preferable that the process annealing is performed in a temperature range where the transformation into austenite from ferrite does not occur. That is, it is preferable that the process annealing is performed in a temperature range lower than the Ac1 temperature. In a case where the process annealing is performed under such a condition, bulging occurs and {100} grains are likely to be grown. Further, it is preferable that the annealing time of the process annealing (a holding time in a temperature range lower than the Ac1 temperature) is set in the range of 5 to 60 sec. Furthermore, it is preferable that the process annealing is performed at 600° C. or more, and it is preferable that the process annealing is performed in a non-oxidizing atmosphere.

The second cold rolling (skin pass rolling) is performed after the process annealing. In a case where the cold rolling is performed in a state where bulging occurs as described above, {100} grains are further grown from a portion where the bulging has occurred as a starting point. It is preferable that a cumulative rolling reduction in the second cold rolling (skin pass rolling) is set in the range of 5 to 25%.

The cumulative rolling reduction mentioned here is represented by $(1-t_1/t_0) \times 100(\%)$ using a sheet thickness to of the steel sheet that is not yet subjected to the second cold rolling and a sheet thickness $t_1$ of the steel sheet that has been subjected to the second cold rolling.

Strain is less likely to be accumulated in {100}<011> grains, and strain is likely to be accumulated in {111}<112> grains. In a case where the annealing is performed after the second cold rolling is performed, {100}<011> grains having less strain encroach {111}<112> grains by using a difference in strain as a driving force. Accordingly, {100} grains are further grown. This encroachment phenomenon, which is caused by using a difference in strain as a driving force, is called strain-induced grain boundary migration (SIBM).

In a case where a cumulative rolling reduction in the second cold rolling is set to 5% or more, a sufficient amount of strain can be ensured and strain-induced grain boundary migration (SIBM) occurs in the subsequent annealing. As a result, {100}<011> grains can be grown to be increased.

Further, in a case where a cumulative rolling reduction in the second cold rolling is set to 25% or less, an excessive increase in the amount of strain can be suppressed. As a result, the occurrence of recrystallization nucleation in which new grains are generated from <112> grains can be suppressed. Since most of grains to be generated in the recrystallization nucleation are <112> grains, the magnetic characteristics of the non-oriented electrical steel sheet may deteriorate in a case where the recrystallization nucleation occurs.

In a case where the non-oriented electrical steel sheet according to this embodiment is controlled to have a desired strain distribution, a cumulative rolling reduction (%) in the first cold rolling is denoted by Rm, and a cumulative rolling reduction (%) in the second cold rolling (skin pass rolling) is denoted by Rs, it is preferable that "86<Rm+0.2×Rs<92" and "5<Rs<20" are satisfied. Since the non-oriented electrical steel sheet has a desired strain distribution, the magnetic characteristics of the non-oriented electrical steel sheet can be improved.

After the second cold rolling (skin pass rolling) is performed, any one or both of the final annealing and the stress relief annealing are performed. In a case where the final annealing is performed, the stress relief annealing may or may not be performed after that. Further, in a case where the stress relief annealing is performed, the final annealing may or may not be performed before the stress relief annealing.

In a case where both the final annealing and the stress relief annealing are performed, a non-oriented electrical steel sheet more excellent in magnetic characteristics can be manufactured.

Since strain generated during the second cold rolling is released in a case where the final annealing is performed under desired conditions, the workability and magnetic characteristics of the non-oriented electrical steel sheet can be improved.

Further, since an effect of releasing strain generated due to punching and an effect of further growing {100} grains can be obtained in a case where the stress relief annealing is performed under desired conditions, the magnetic characteristics of the non-oriented electrical steel sheet can be improved.

The steel sheet is held for 2 hours or less in a temperature range lower than the Ac1 temperature in the final annealing. It is preferable that the hot-rolled steel sheet is held for 1 hour or less. The final annealing is performed at a temperature where ferrite is not transformed into austenite so that the magnetic characteristics of the non-oriented electrical steel sheet do not deteriorate. For this reason, the final annealing is performed in a temperature range lower than the Ac temperature. Since {100} grains encroach {111} grains in a case where the final annealing is performed under such conditions, the magnetic characteristics of the non-oriented electrical steel sheet can be improved.

It is preferable that the steel sheet is held for 10 to 1200 sec in a temperature range equal to or higher than 600° C. and lower than the Ac1 temperature in the final annealing. Since strain generated in the second cold rolling (skin pass rolling) can be sufficiently released in a case where the holding time is set to 10 sec or more, warpage generated during punching into a complicated shape can be suppressed, that is, the workability of the non-oriented electrical steel sheet can be improved.

In a case where the holding time is set to 1200 sec or less, it is possible to suppress that grains become too coarse. As a result, a decrease in punching accuracy caused by an increase in sag during punching can be suppressed, that is, the workability of the non-oriented electrical steel sheet can be improved.

Further, since strain generated in the second cold rolling (skin pass rolling) can be sufficiently released in a case where a holding temperature is set to 600° C. or more, warpage generated during punching into a complicated shape can be suppressed, that is, the workability of the non-oriented electrical steel sheet can be improved.

Punching is performed as necessary after the final annealing or after the second cold rolling (in a case where the final annealing is omitted). Accordingly, the non-oriented electrical steel sheet is worked into a desired shape.

The stress relief annealing is performed after the second cold rolling or after the finish rolling.

The steel sheet is held for 1200 sec or more in a temperature range equal to or higher than 600° C. and lower than the Ac temperature in the stress relief annealing. Since the steel sheet is held for 1200 sec or more, an effect of sufficiently releasing strain generated during punching and an effect of further growing {100} grains can be obtained. As a result, the magnetic characteristics of the non-oriented electrical steel sheet can be improved.

In a case where the steel sheet is held in a temperature range equal to or higher than the Ac1 temperature, a part or all of ferrite is transformed into austenite and the austenite is transformed into ferrite during cooling after holding. As a result, {100}<011> orientation is significantly reduced, so that the magnetic characteristics of the non-oriented electrical steel sheet deteriorates. For this reason, a holding temperature in the stress relief annealing is set to be lower than the Ac temperature.

Further, even though the steel sheet is held in a temperature range lower than 600° C., the effect of releasing strain and the effect of growing {100} grains having been described above cannot be obtained. For this reason, a holding temperature in the stress relief annealing is set to 600° C. or more.

It is preferable that the steel sheet is held for 1 hour or more in a temperature range equal to or higher than 750° C. and lower than the Ac1 temperature in the stress relief annealing. In a case where the steel sheet is held for 1 hour or more in a temperature range equal to or higher than 750° C., the effect of releasing strain and the effect of growing {100} grains having been described above can be more reliably obtained.

The upper limit of the holding time is not particularly limited, but may be set to, for example, 4 hours or less or 3 hours or less.

The non-oriented electrical steel sheet according to this embodiment can be manufactured by the above-mentioned method.

In this embodiment, the Ar1 temperature is obtained from a change in the thermal expansion of a steel material (steel sheet) that is being cooled at an average cooling rate of 1° C./sec. Further, in this embodiment, the Ac1 temperature is obtained from a change in the thermal expansion of a steel material (steel sheet) that is being heated at an average heating rate of 1° C./sec.

The non-oriented electrical steel sheet according to this embodiment is suitably applied to, for example, the core of a rotating electrical machine. In this case, individual flat sheet-like thin plates are cut out from the non-oriented electrical steel sheet according to this embodiment and these flat sheet-like thin plates are appropriately laminated, so that a core to be used for a rotating electrical machine is produced. Since a non-oriented electrical steel sheet having excellent magnetic characteristics is applied to this core, the iron loss of the core is low. As a result, a rotating electrical machine having excellent torque is obtained.

EXAMPLES

Next, the method for manufacturing a non-oriented electrical steel sheet according to the embodiment of the invention will be specifically described with reference to examples. Examples to be described below are merely examples of the method for manufacturing a non-oriented electrical steel sheet according to the embodiment of the invention, and the method for manufacturing a non-oriented electrical steel sheet according to the embodiment of the invention is not limited to the following examples.

First Example

Molten steel was casted to produce slabs having chemical compositions shown in Table 1 to be described below. The left side of Expression shown in Table 1 represents the value of the left side of Expression (1) having been described above. After that, the produced slabs were heated up to 1150° C. and were subjected to hot rolling under conditions shown in Table 2, so that hot-rolled steel sheets having a sheet thickness of 2.5 mm were obtained.

The finishing temperature of finish rolling was 800° C., and was a temperature higher than the Ar1 temperatures of all the steel sheets.

Then, pickling was performed on the obtained hot-rolled steel sheets to remove scale. After that, first cold rolling was performed at a cumulative rolling reduction of 85% until a sheet thickness reached 0.385 mm, so that steel sheets (cold-rolled steel sheets) were obtained. Process annealing for heating the obtained steel sheets and holding the steel sheets for 5 to 60 sec at 700° C., which is a temperature lower than the Ac1 temperatures of all the steel sheets, in a non-oxidizing atmosphere was performed. Then, second cold rolling (skin pass rolling) was performed at a cumulative rolling reduction of 9% until a sheet thickness reached 0.35 mm.

Ac1 temperatures of all the examples shown in Table 1 were about 850° C. The Ar1 temperature was obtained from a change in the thermal expansion of the steel sheet that was being cooled at an average cooling rate of 1° C./sec, and the Ac1 temperature was obtained from a change in the thermal expansion of the steel sheet that was being heated at an average heating rate of 1° C./sec.

After the second cold rolling (skin pass rolling) was performed, final annealing was performed. Achieving temperatures (holding temperatures) and holding times in this case are shown in Table 2.

In order to evaluate the workability of a non-oriented electrical steel sheet, a test for evaluating punching accuracy was performed after the final annealing. A punching die of 3 mm×50 mm was used in the test to measure the shape of a punched material. Punching was performed so that a long side direction was parallel to the rolling direction of the steel sheet. The long side and the short side of the punched material were measured in the measurement of a shape, and one end of the punched material in the long side direction was pressed with a finger and the lift distance of the other end thereof was measured.

After the final annealing was performed, stress relief annealing for holding the steel sheets for 2 hours at 800° C. was performed. After the stress relief annealing was performed, magnetic flux densities B50 were measured using a single-sheet magnetic measurement device. Samples of 55 mm square were taken in two directions that were inclined with respect to the rolling directions of the steel sheets by 0° and 45°, and magnetic flux densities B50 were measured. The magnetic flux density in the direction inclined with respect to the rolling direction by 45° was referred to as the magnetic flux density B50 in a 45° direction. The whole circumferential average of the magnetic flux densities B50 was obtained from the calculation of an average value of the magnetic flux densities in directions inclined with respect to the rolling direction by 0°, 45°, 90°, and 135°.

Further, energy losses (W/kg) of the samples, which were obtained from the non-oriented electrical steel sheets, on the whole circumferential average, which were generated in a case where an AC magnetic field having a frequency of 400 Hz was applied so that the maximum magnetic flux density was 1.0 T, were measured, so that iron losses W10/400 were obtained.

TABLE 1

| | Chemical composition (mass %) Remainder iron and impurities | | | | | | | | | | | | |
|---|---|---|---|---|---|---|---|---|---|---|---|---|---|
| No. | C | Si | sol-Al | S | N | Mn | Ni | Co | Pt | Pb | Cu | Au | Left side of Expression |
| 101 | 0.0013 | 2.50 | 0.013 | 0.0020 | 0.0022 | 3.12 | — | — | — | — | — | — | 0.61 |
| 102 | 0.0010 | 2.51 | 0.012 | 0.0017 | 0.0019 | — | 3.11 | — | — | — | — | — | 0.58 |
| 103 | 0.0008 | 2.51 | 0.009 | 0.0023 | 0.0018 | — | — | 3.08 | — | — | — | — | 0.56 |
| 104 | 0.0011 | 2.54 | 0.012 | 0.0021 | 0.0018 | — | — | — | 3.08 | — | — | — | 0.53 |
| 105 | 0.0011 | 2.48 | 0.010 | 0.0024 | 0.0019 | — | — | — | — | 3.08 | — | — | 0.59 |
| 106 | 0.0008 | 2.53 | 0.011 | 0.0017 | 0.0023 | — | — | — | — | — | 3.10 | — | 0.55 |
| 107 | 0.0010 | 2.52 | 0.013 | 0.0019 | 0.0018 | — | — | — | — | — | — | 3.08 | 0.54 |
| 108 | 0.0011 | 2.49 | 0.010 | 0.0022 | 0.0024 | 3.12 | — | — | — | — | — | — | 0.63 |
| 109 | 0.0014 | 2.48 | 0.011 | 0.0020 | 0.0021 | 3.07 | — | — | — | — | — | — | 0.59 |
| 110 | 0.0012 | 2.48 | 0.007 | 0.0019 | 0.0022 | 3.11 | — | — | — | — | — | — | 0.62 |
| 111 | 0.0007 | 2.51 | 0.010 | 0.0019 | 0.0021 | 3.14 | — | — | — | — | — | — | 0.62 |
| 112 | 0.0007 | 2.49 | 0.009 | 0.0018 | 0.0023 | 3.10 | — | — | — | — | — | — | 0.61 |
| 113 | 0.0011 | 2.51 | 0.014 | 0.0023 | 0.0019 | 3.14 | — | — | — | — | — | — | 0.61 |
| 114 | 0.0014 | 2.53 | 0.010 | 0.0017 | 0.0017 | 3.09 | — | — | — | — | — | — | 0.56 |
| 115 | 0.0013 | 2.46 | 0.010 | 0.0020 | 0.0023 | 3.09 | — | — | — | — | — | — | 0.62 |
| 116 | 0.0012 | 2.49 | 0.013 | 0.0021 | 0.0023 | 3.09 | — | — | — | — | — | — | 0.58 |
| 117 | 0.0012 | 2.47 | 0.007 | 0.0020 | 0.0017 | 3.08 | — | — | — | — | — | — | 0.60 |
| 118 | 0.0011 | 2.47 | 0.009 | 0.0018 | 0.0018 | 3.09 | — | — | — | — | — | — | 0.61 |
| 119 | 0.0008 | 2.50 | 0.010 | 0.0021 | 0.0021 | 3.12 | — | — | — | — | — | — | 0.61 |

TABLE 1-continued

| | Chemical composition (mass %) Remainder iron and impurities | | | | | | | | | | | | |
|---|---|---|---|---|---|---|---|---|---|---|---|---|---|
| No. | C | Si | sol-Al | S | N | Mn | Ni | Co | Pt | Pb | Cu | Au | Left side of Expression |
| 120 | 0.0010 | 2.48 | 0.298 | 0.0021 | 0.0022 | 3.40 | — | — | — | — | — | — | 0.63 |
| 121 | 0.0011 | 2.49 | 0.299 | 0.0019 | 0.0020 | — | 3.42 | — | — | — | — | — | 0.62 |
| 122 | 0.0010 | 2.49 | 0.301 | 0.0022 | 0.0022 | — | — | 3.41 | — | — | — | — | 0.62 |
| 123 | 0.0009 | 2.52 | 0.302 | 0.0021 | 0.0020 | — | — | — | 3.39 | — | — | — | 0.56 |
| 124 | 0.0011 | 2.51 | 0.298 | 0.0022 | 0.0021 | — | — | — | — | 3.41 | — | — | 0.60 |
| 125 | 0.0011 | 2.49 | 0.297 | 0.0019 | 0.0022 | — | — | — | — | — | 3.41 | — | 0.62 |
| 126 | 0.0009 | 2.50 | 0.299 | 0.0019 | 0.0018 | — | — | — | — | — | — | 3.41 | 0.61 |
| 127 | 0.0011 | 2.50 | 0.298 | 0.0018 | 0.0020 | 3.38 | — | — | — | — | — | — | 0.59 |
| 128 | 0.0009 | 2.50 | 0.297 | 0.0021 | 0.0018 | 3.40 | — | — | — | — | — | — | 0.60 |
| 129 | 0.0008 | 2.51 | 0.297 | 0.0020 | 0.0019 | 3.40 | — | — | — | — | — | — | 0.59 |
| 130 | 0.0008 | 2.49 | 0.299 | 0.0019 | 0.0019 | 3.42 | — | — | — | — | — | — | 0.63 |
| 131 | 0.0010 | 2.50 | 0.303 | 0.0021 | 0.0020 | 3.42 | — | — | — | — | — | — | 0.61 |
| 132 | 0.0011 | 2.54 | 0.600 | 0.0020 | 0.0022 | 3.71 | — | — | — | — | — | — | 0.57 |

TABLE 2

| | Hot rolling | Final annealing conditions | | Punching test | | | Magnetic characteristics after annealing performed for 2 hours at 800° C. | | | |
|---|---|---|---|---|---|---|---|---|---|---|
| No. | Winding temperature (° C.) | Achieving temperature (° C.) | Time in temperature range equal to or higher than 600° C. and lower than Ac1 (sec) | Length of long side (mm) | Length of short side (mm) | Lift distance (µm) | B50 in 45° direction (T) | B50 on whole circumferential average (T) | W10/400 (W/kg) | Note |
| 101 | 500 | 700 | 30 | 49.997 | 2.999 | 0 | 1.812 | 1.678 | 15.15 | Example of invention |
| 102 | 500 | 700 | 30 | 49.997 | 2.999 | 0 | 1.811 | 1.681 | 15.03 | Example of invention |
| 103 | 500 | 700 | 30 | 49.997 | 2.999 | 0 | 1.811 | 1.677 | 15.05 | Example of invention |
| 104 | 500 | 700 | 30 | 49.997 | 2.999 | 0 | 1.812 | 1.681 | 15.01 | Example of invention |
| 105 | 500 | 700 | 30 | 49.997 | 2.999 | 0 | 1.810 | 1.677 | 15.11 | Example of invention |
| 106 | 500 | 700 | 30 | 49.997 | 2.999 | 0 | 1.812 | 1.677 | 15.06 | Example of invention |
| 107 | 500 | 700 | 30 | 49.997 | 2.999 | 0 | 1.813 | 1.676 | 15.14 | Example of invention |
| 108 | 500 | 650 | 30 | 49.997 | 2.999 | 0 | 1.810 | 1.676 | 15.17 | Example of invention |
| 109 | 500 | 750 | 30 | 49.997 | 2.999 | 0 | 1.809 | 1.679 | 15.10 | Example of invention |
| 110 | 500 | 800 | 30 | 49.997 | 2.999 | 0 | 1.811 | 1.681 | 15.02 | Example of invention |
| 111 | 500 | 900 | 30 | 49.990 | 2.995 | 0 | 1.528 | 1.613 | 19.13 | Comparative Example |
| 112 | 500 | 700 | 15 | 49.997 | 2.999 | 10 | 1.809 | 1.683 | 15.19 | Example of invention |
| 113 | 500 | 700 | 120 | 49.996 | 2.998 | 0 | 1.810 | 1.682 | 15.05 | Example of invention |
| 114 | 500 | 700 | 1100 | 49.995 | 2.998 | 0 | 1.811 | 1.683 | 15.18 | Example of invention |
| 115 | 500 | 700 | 1500 | 49.992 | 2.996 | 0 | 1.814 | 1.678 | 15.17 | Example of invention |
| 116 | 500 | 700 | 7200 | 49.991 | 2.995 | 0 | 1.814 | 1.680 | 15.15 | Example of invention |
| 117 | 500 | 700 | 5 | 49.998 | 3.000 | 156 | 1.814 | 1.677 | 15.17 | Example of invention |
| 118 | 600 | 700 | 30 | 49.997 | 2.999 | 0 | 1.788 | 1.648 | 16.53 | Comparative Example |
| 119 | 200 | 700 | 30 | 49.997 | 2.999 | 0 | 1.791 | 1.651 | 16.42 | Comparative Example |
| 120 | 500 | 700 | 30 | 49.997 | 2.999 | 0 | 1.805 | 1.669 | 14.73 | Example of invention |
| 121 | 500 | 700 | 30 | 49.997 | 2.999 | 0 | 1.804 | 1.669 | 14.70 | Example of invention |
| 122 | 500 | 700 | 30 | 49.997 | 2.999 | 0 | 1.806 | 1.667 | 14.77 | Example of invention |
| 123 | 500 | 700 | 30 | 49.997 | 2.999 | 0 | 1.804 | 1.669 | 14.73 | Example of invention |

TABLE 2-continued

| | Hot rolling | | Final annealing conditions Time in temperature range | Punching test | | | Magnetic characteristics after annealing performed for 2 hours at 800° C. | | | |
|---|---|---|---|---|---|---|---|---|---|---|
| No. | Winding temperature (° C.) | Achieving temperature (° C.) | equal to or higher than 600° C. and lower than Ac1 (sec) | Length of long side (mm) | Length of short side (mm) | Lift distance (μm) | B50 in 45° direction (T) | B50 on whole circumferential average (T) | W10/400 (W/kg) | Note |
| 124 | 500 | 700 | 30 | 49.997 | 2.999 | 0 | 1.803 | 1.669 | 14.76 | Example of invention |
| 125 | 500 | 700 | 30 | 49.997 | 2.999 | 0 | 1.806 | 1.671 | 14.80 | Example of invention |
| 126 | 500 | 700 | 30 | 49.997 | 2.999 | 0 | 1.804 | 1.669 | 14.67 | Example of invention |
| 127 | <u>600</u> | 700 | 30 | 49.997 | 2.999 | 0 | 1.784 | 1.643 | 15.25 | Comparative Example |
| 128 | 400 | 700 | 30 | 49.997 | 2.999 | 0 | 1.803 | 1.670 | 14.76 | Example of invention |
| 129 | 300 | 700 | 30 | 49.997 | 2.999 | 0 | 1.801 | 1.665 | 14.82 | Example of invention |
| 130 | <u>200</u> | 700 | 30 | 49.997 | 2.999 | 0 | 1.784 | 1.643 | 15.27 | Comparative Example |
| 131 | 500 | <u>900</u> | 30 | 49.990 | 2.995 | 0 | 1.518 | 1.608 | 19.17 | Comparative Example |
| 132 | 500 | 700 | 30 | 49.997 | 2.999 | 0 | 1.801 | 1.661 | 14.21 | Example of invention |

Underlines shown in Table 2 represent conditions out of the scope of the invention. Nos. 101 to 110, Nos. 112 to 114, Nos. 120 to 126, No. 128, and Nos. 129 and 132, which were the examples of the invention, were excellent in workability (also had high dimensional accuracy after punching and had almost no lift distance), and had excellent magnetic characteristics both in the 450 direction and on the whole circumferential average (high magnetic flux densities B50 and low iron losses W10/400). Further, Nos. 115 to 117, which were the examples of the invention, had excellent magnetic characteristics but were slightly inferior to the other examples of the invention in terms of workability.

On the other hand, since the holding temperature of No. 111, which was a comparative example, during the final annealing was higher than the Ac1 temperature, the dimensional accuracy of No. 111 deteriorated and the magnetic flux density thereof also deteriorated. Further, since the winding temperatures of Nos. 118, 119, 127, and 130, which were comparative examples, were not appropriate, the magnetic flux densities thereof deteriorated and/or the iron losses thereof were increased.

Second Example

Molten steel was casted to produce slabs having chemical compositions shown in Table 3 to be described below. The left side of Expression shown in Table 3 represents the value of the left side of Expression (1) having been described above. After that, the produced slabs were heated up to 1150° C. and were subjected to hot rolling under conditions shown in Table 4, so that hot-rolled steel sheets having a sheet thickness of 2.5 mm were obtained.

The hot-rolled steel sheets were cooled up to 500° C. by water after finish rolling, and were then wound.

The finishing temperature of finish rolling was 800° C., and was a temperature higher than the Ar1 temperatures of all the steel sheets.

Then, pickling was performed on the obtained hot-rolled steel sheets to remove scale. After that, first cold rolling was performed at a cumulative rolling reduction of 85% until a sheet thickness reached 0.385 mm, so that steel sheets (cold-rolled steel sheets) were obtained. Process annealing for heating the obtained steel sheets and holding the steel sheets for 5 to 60 sec at 700° C., which is a temperature lower than the Ac1 temperatures of all the steel sheets, in a non-oxidizing atmosphere was performed. Then, second cold rolling (skin pass rolling) was performed at a cumulative rolling reduction of 9% until a sheet thickness reached 0.35 mm.

After the second cold rolling (skin pass rolling) was performed, final annealing for holding the steel sheets for 30 sec at 700° C., which was lower than the Ac temperatures of all the steel sheets, was performed. Then, the evaluation of workability and the measurement of magnetic flux densities B50 and iron losses W10/400 were performed by the same methods as in the first example. The Ar1 temperatures and the Ac1 temperatures were measured by the same methods as in the first example.

TABLE 3

| | Chemical composition (mass %) Remainder iron and impurities | | | | | | | | | | |
|---|---|---|---|---|---|---|---|---|---|---|---|
| No. | C | Si | sol-Al | S | N | Mn | Sn | Sb | P | Mg | Ca |
| 201 | 0.0010 | 2.46 | 0.013 | 0.0023 | 0.0024 | 3.08 | — | — | — | — | — |
| 202 | 0.0007 | 2.50 | 0.013 | 0.0019 | 0.0020 | 3.11 | 0.050 | — | — | — | — |
| 203 | 0.0011 | 2.54 | 0.007 | 0.0018 | 0.0022 | 3.10 | — | 0.054 | — | — | — |
| 204 | 0.0012 | 2.49 | 0.011 | 0.0021 | 0.0020 | 3.12 | — | — | 0.047 | — | — |
| 205 | 0.0006 | 2.47 | 0.011 | 0.0018 | 0.0019 | 3.09 | — | — | — | 0.0047 | — |
| 206 | 0.0014 | 2.49 | 0.010 | 0.0018 | 0.0022 | 3.08 | — | — | — | — | 0.0048 |
| 207 | 0.0007 | 2.51 | 0.008 | 0.0018 | 0.0023 | 3.08 | — | — | — | — | — |

TABLE 3-continued

| | | | | | | | | | | |
|---|---|---|---|---|---|---|---|---|---|---|
| 208 | 0.0012 | 2.51 | 0.013 | 0.0017 | 0.0023 | 3.10 | — | — | — | — |
| 209 | 0.0010 | 2.46 | 0.008 | 0.0020 | 0.0019 | 3.09 | — | — | — | — |
| 210 | 0.0010 | 2.49 | 0.009 | 0.0021 | 0.0020 | 3.09 | — | — | — | — |
| 211 | 0.0012 | 2.51 | 0.010 | 0.0021 | 0.0018 | 3.09 | — | — | — | — |
| 212 | 0.0008 | 2.49 | 0.006 | 0.0016 | 0.0024 | 3.13 | — | — | — | — |
| 213 | 0.0006 | 2.48 | 0.007 | 0.0017 | 0.0018 | 3.14 | — | — | — | — |
| 214 | 0.0007 | 2.53 | 0.008 | 0.0021 | 0.0024 | 3.10 | — | — | — | — |
| 215 | 0.0008 | 2.50 | 0.306 | 0.0023 | 0.0022 | 3.42 | 0.051 | — | — | — |
| 216 | 0.0012 | 2.53 | 0.601 | 0.0019 | 0.0020 | 3.73 | 0.050 | — | — | — |

Chemical composition (mass %) Remainder iron and impurities

| No. | Sr | Ba | Ce | La | Nd | Pr | Zn | Cd | Left side of Expression |
|---|---|---|---|---|---|---|---|---|---|
| 201 | — | — | — | — | — | — | — | — | 0.60 |
| 202 | — | — | — | — | — | — | — | — | 0.59 |
| 203 | — | — | — | — | — | — | — | — | 0.56 |
| 204 | — | — | — | — | — | — | — | — | 0.62 |
| 205 | — | — | — | — | — | — | — | — | 0.61 |
| 206 | — | — | — | — | — | — | — | — | 0.58 |
| 207 | 0.0048 | — | — | — | — | — | — | — | 0.56 |
| 208 | — | 0.0052 | — | — | — | — | — | — | 0.57 |
| 209 | — | — | 0.0053 | — | — | — | — | — | 0.62 |
| 210 | — | — | — | 0.0052 | — | — | — | — | 0.59 |
| 211 | — | — | — | — | 0.0050 | — | — | — | 0.58 |
| 212 | — | — | — | — | — | 0.0052 | — | — | 0.63 |
| 213 | — | — | — | — | — | — | 0.0054 | — | 0.65 |
| 214 | — | — | — | — | — | — | — | 0.0050 | 0.57 |
| 215 | — | — | — | — | — | — | — | — | 0.61 |
| 216 | — | — | — | — | — | — | — | — | 0.60 |

TABLE 4

| | Final annealing conditions | | Punching test | | | Magnetic characteristics after annealing performed for 2 hours at 800° C. | | | |
|---|---|---|---|---|---|---|---|---|---|
| No. | Achieving temperature (° C.) | Time in temperature range equal to or higher than 600° C. and lower than Ac1 (sec) | Length of long side (mm) | Length of short side (mm) | Lift distance (μm) | B50 in 45° direction (T) | B50 on whole circumferential average (T) | W10/400 (W/kg) | Note |
| 201 | 700 | 30 | 49.997 | 2.999 | 0 | 1.807 | 1.678 | 15.13 | Example of invention |
| 202 | 700 | 30 | 49.997 | 2.999 | 0 | 1.821 | 1.688 | 15.07 | Example of invention |
| 203 | 700 | 30 | 49.997 | 2.999 | 0 | 1.821 | 1.689 | 15.07 | Example of invention |
| 204 | 700 | 30 | 49.997 | 2.999 | 0 | 1.822 | 1.693 | 15.12 | Example of invention |
| 205 | 700 | 30 | 49.997 | 2.999 | 0 | 1.811 | 1.681 | 14.72 | Example of invention |
| 206 | 700 | 30 | 49.997 | 2.999 | 0 | 1.811 | 1.682 | 14.67 | Example of invention |
| 207 | 700 | 30 | 49.997 | 2.999 | 0 | 1.807 | 1.677 | 14.68 | Example of invention |
| 208 | 700 | 30 | 49.997 | 2.999 | 0 | 1.813 | 1.682 | 14.67 | Example of invention |
| 209 | 700 | 30 | 49.997 | 2.999 | 0 | 1.811 | 1.679 | 14.71 | Example of invention |
| 210 | 700 | 30 | 49.997 | 2.999 | 0 | 1.812 | 1.682 | 14.74 | Example of invention |
| 211 | 700 | 30 | 49.997 | 2.999 | 0 | 1.808 | 1.682 | 14.70 | Example of invention |
| 212 | 700 | 30 | 49.997 | 2.999 | 0 | 1.814 | 1.678 | 14.74 | Example of invention |
| 213 | 700 | 30 | 49.997 | 2.999 | 0 | 1.807 | 1.679 | 14.67 | Example of invention |
| 214 | 700 | 30 | 49.997 | 2.999 | 0 | 1.813 | 1.677 | 14.71 | Example of invention |
| 215 | 700 | 30 | 49.997 | 2.999 | 0 | 1.815 | 1.683 | 14.66 | Example of invention |
| 216 | 700 | 30 | 49.997 | 2.999 | 0 | 1.809 | 1.677 | 14.25 | Example of invention |

All of Nos. 201 to 216 were examples of the invention, were excellent in workability (had good dimensional accuracy after punching and had short lift distances), and had excellent magnetic characteristics (high magnetic flux densities B50 and low iron losses W10/400). In particular, the magnetic flux densities B50 of Nos. 202 to 204 were higher than those of No. 201 and Nos. 205 to 214. The iron losses W10/400 of Nos. 205 to 214 were lower than those of Nos. 201 to 204. The iron losses W10/400 of Nos. 215 and 216 were lower than the iron loss W10/400 of No. 202, but the magnetic flux densities B50 of Nos. 215 and 216 were lower than the magnetic flux density B50 of No. 202.

Third Example

Molten steel was casted to produce slabs having chemical compositions shown in Table 5 to be described below. The left side of Expression shown in Table 5 represents the value of the left side of Expression (1) having been described above. After that, the produced slabs were heated up to 1150° C. and were subjected to hot rolling under conditions shown in Table 6, so that hot-rolled steel sheets having a sheet thickness of 2.5 mm were obtained.

The finishing temperature of finish rolling was 800° C., and was a temperature higher than the Ar1 temperatures of all the steel sheets.

Then, pickling was performed on the obtained hot-rolled steel sheets to remove scale. After that, first cold rolling was performed at a cumulative rolling reduction of 85% until a sheet thickness reached 0.385 mm, so that steel sheets (cold-rolled steel sheets) were obtained. Process annealing for heating the obtained steel sheets and holding the steel sheets for 5 to 60 sec at 700° C., which is a temperature lower than the Ac1 temperatures of all the steel sheets, in a non-oxidizing atmosphere was performed. Then, second cold rolling (skin pass rolling) was performed at a cumulative rolling reduction of 9% until a sheet thickness reached 0.35 mm.

The Ac1 temperatures of all examples shown in Table 5 were about 850° C.

After the second cold rolling (skin pass rolling) was performed, final annealing was performed. Achieving temperatures (holding temperatures) and holding times in this case are shown in Table 6. Then, the evaluation of workability and the measurement of magnetic flux densities B50 and iron losses W10/400 were performed by the same methods as in the first example. The Ar1 temperatures and the Ac1 temperatures were measured by the same methods as in the first example.

Stress relief annealing was not performed in this example.

TABLE 5

| | Chemical composition (mass %) Remainder iron and impurities | | | | | | | | | | | | Left side of |
|---|---|---|---|---|---|---|---|---|---|---|---|---|---|
| No. | C | Si | sol-Al | S | N | Mn | Ni | Co | Pt | Pb | Cu | Au | Expression |
| 301 | 0.0010 | 2.48 | 0.011 | 0.0018 | 0.0018 | 3.08 | — | — | — | — | — | — | 0.59 |
| 302 | 0.0012 | 2.54 | 0.011 | 0.0019 | 0.0019 | — | 3.09 | — | — | — | — | — | 0.54 |
| 303 | 0.0012 | 2.51 | 0.011 | 0.0018 | 0.0020 | — | — | 3.10 | — | — | — | — | 0.57 |
| 304 | 0.0008 | 2.48 | 0.011 | 0.0019 | 0.0019 | — | — | — | 3.12 | — | — | — | 0.63 |
| 305 | 0.0009 | 2.53 | 0.011 | 0.0018 | 0.0021 | — | — | — | — | 3.07 | — | — | 0.53 |
| 306 | 0.0009 | 2.53 | 0.011 | 0.0020 | 0.0021 | — | — | — | — | — | 3.11 | — | 0.57 |
| 307 | 0.0008 | 2.48 | 0.011 | 0.0021 | 0.0020 | — | — | — | — | — | — | 3.08 | 0.59 |
| 308 | 0.0011 | 2.51 | 0.011 | 0.0019 | 0.0020 | 3.09 | — | — | — | — | — | — | 0.57 |
| 309 | 0.0008 | 2.51 | 0.011 | 0.0020 | 0.0022 | 3.14 | — | — | — | — | — | — | 0.61 |
| 310 | 0.0011 | 2.52 | 0.011 | 0.0020 | 0.0019 | 3.10 | — | — | — | — | — | — | 0.56 |
| 311 | 0.0010 | 2.47 | 0.011 | 0.0018 | 0.0018 | 3.06 | — | — | — | — | — | — | 0.58 |
| 312 | 0.0010 | 2.53 | 0.011 | 0.0019 | 0.0019 | 3.08 | — | — | — | — | — | — | 0.53 |
| 313 | 0.0010 | 2.48 | 0.011 | 0.0018 | 0.0020 | 3.11 | — | — | — | — | — | — | 0.62 |
| 314 | 0.0009 | 2.47 | 0.011 | 0.0020 | 0.0021 | 3.07 | — | — | — | — | — | — | 0.58 |
| 315 | 0.0010 | 2.49 | 0.011 | 0.0021 | 0.0019 | 3.08 | — | — | — | — | — | — | 0.58 |
| 316 | 0.0012 | 2.53 | 0.011 | 0.0020 | 0.0022 | 3.08 | — | — | — | — | — | — | 0.54 |
| 317 | 0.0008 | 2.49 | 0.011 | 0.0019 | 0.0018 | 3.06 | — | — | — | — | — | — | 0.56 |
| 318 | 0.0008 | 2.51 | 0.011 | 0.0020 | 0.0021 | 3.08 | — | — | — | — | — | — | 0.56 |
| 319 | 0.0011 | 2.49 | 0.011 | 0.0020 | 0.0022 | 3.11 | — | — | — | — | — | — | 0.61 |
| 320 | 0.0012 | 2.48 | 0.300 | 0.0020 | 0.0021 | 3.37 | — | — | — | — | — | — | 0.59 |
| 321 | 0.0011 | 2.52 | 0.600 | 0.0019 | 0.0021 | 3.73 | — | — | — | — | — | — | 0.61 |

TABLE 6

| | Hot rolling | Final annealing conditions | | Punching test | | | Magnetic characteristics after annealing performed for 2 hours at 800° C. | | | |
|---|---|---|---|---|---|---|---|---|---|---|
| No. | Winding temperature (° C.) | Achieving temperature (° C.) | Time in temperature range equal to or higher than 600° C. and lower than Ac1 (sec) | Length of long side (mm) | Length of short side (mm) | Lift distance (μm) | B50 in 45° direction (T) | B50 on whole circumferential average (T) | W10/400 (W/kg) | Note |
| 301 | 500 | 700 | 30 | 49.997 | 2.999 | 0 | 1.819 | 1.690 | 19.56 | Example of invention |
| 302 | 500 | 700 | 30 | 49.997 | 2.999 | 0 | 1.819 | 1.694 | 19.62 | Example of invention |

TABLE 6-continued

| | Hot rolling | | Final annealing conditions | Punching test | | | Magnetic characteristics after annealing performed for 2 hours at 800° C. | | | |
|---|---|---|---|---|---|---|---|---|---|---|
| | | | Time in temperature range | | | | | | | |
| No. | Winding temperature (° C.) | Achieving temperature (° C.) | equal to or higher than 600° C. and lower than Ac1 (sec) | Length of long side (mm) | Length of short side (mm) | Lift distance (μm) | B50 in 45° direction (T) | B50 on whole circumferential average (T) | W10/400 (W/kg) | Note |
| 303 | 500 | 700 | 30 | 49.997 | 2.999 | 0 | 1.818 | 1.686 | 19.58 | Example of invention |
| 304 | 500 | 700 | 30 | 49.997 | 2.999 | 0 | 1.818 | 1.691 | 19.57 | Example of invention |
| 305 | 500 | 700 | 30 | 49.997 | 2.999 | 0 | 1.818 | 1.690 | 19.63 | Example of invention |
| 306 | 500 | 700 | 30 | 49.997 | 2.999 | 0 | 1.821 | 1.688 | 19.60 | Example of invention |
| 307 | 500 | 700 | 30 | 49.997 | 2.999 | 0 | 1.823 | 1.687 | 19.61 | Example of invention |
| 308 | 500 | 650 | 30 | 49.997 | 2.999 | 0 | 1.821 | 1.689 | 19.59 | Example of invention |
| 309 | 500 | 750 | 30 | 49.997 | 2.999 | 0 | 1.820 | 1.694 | 19.59 | Example of invention |
| 310 | 500 | 800 | 30 | 49.997 | 2.999 | 0 | 1.822 | 1.690 | 19.60 | Example of invention |
| 311 | 500 | <u>900</u> | 30 | 49.990 | 2.995 | 0 | 1.529 | 1.614 | 21.14 | Comparativ Example |
| 312 | 500 | 700 | 15 | 49.997 | 2.999 | 8 | 1.820 | 1.692 | 19.63 | Example of invention |
| 313 | 500 | 700 | 120 | 49.996 | 2.998 | 0 | 1.817 | 1.687 | 19.59 | Example of invention |
| 314 | 500 | 700 | 1100 | 49.995 | 2.998 | 0 | 1.824 | 1.689 | 19.62 | Example of invention |
| 315 | 500 | 700 | 1500 | 49.992 | 2.996 | 0 | 1.817 | 1.691 | 19.59 | Example of invention |
| 316 | 500 | 700 | 7200 | 49.991 | 2.995 | 0 | 1.822 | 1.691 | 19.60 | Example of invention |
| 317 | 500 | 700 | 5 | 49.998 | 3.000 | 161 | 1.817 | 1.688 | 19.58 | Example of invention |
| 318 | <u>600</u> | 700 | 30 | 49.997 | 2.999 | 0 | 1.800 | 1.672 | 20.56 | Comparative Example |
| 319 | <u>200</u> | 700 | 30 | 49.997 | 2.999 | 0 | 1.802 | 1.670 | 20.58 | Comparative Example |
| 320 | 500 | 700 | 30 | 49.997 | 2.999 | 0 | 1.812 | 1.682 | 18.50 | Example of invention |
| 321 | 500 | 700 | 30 | 49.997 | 2.999 | 0 | 1.805 | 1.677 | 17.51 | Example of invention |

Underlines shown in Table 6 represent conditions out of the scope of the invention. Nos. 301 to 310, Nos. 312 to 314, and Nos. 320 and 321, which were the examples of the invention, were excellent in workability (also had high dimensional accuracy after punching and had almost no lift distance), and had excellent magnetic characteristics both in the 45° direction and on the whole circumferential average (high magnetic flux densities B50 and low iron losses W10/400). Further, Nos. 315 to 317, which were the examples of the invention, had good magnetic characteristics but were slightly inferior to the other examples of the invention in terms of workability.

On the other hand, since the holding temperature of No. 311, which was a comparative example, during the final annealing was higher than the Ac1 temperature, the dimensional accuracy of No. 311 deteriorated and the magnetic flux density thereof also deteriorated. Further, since the winding temperatures of Nos. 318 and 319, which were comparative examples, were not appropriate, the magnetic flux densities thereof deteriorated and the iron losses thereof were increased.

Fourth Example

Molten steel was casted to produce slabs having chemical compositions shown in Table 7 to be described below. The left side of Expression shown in Table 7 represents the value of the left side of Expression (1) having been described above. After that, the produced slabs were heated up to 1150° C. and were subjected to hot rolling under conditions shown in Table 8, so that hot-rolled steel sheets having a sheet thickness of 2.5 mm were obtained.

The finishing temperature of finish rolling was 800° C., and was a temperature higher than the Ar1 temperatures of all the steel sheets.

Then, pickling was performed on the obtained hot-rolled steel sheets to remove scale. After that, first cold rolling was performed at a cumulative rolling reduction of 85% until a sheet thickness reached 0.385 mm, so that steel sheets (cold-rolled steel sheets) were obtained. Process annealing for heating the obtained steel sheets and holding the steel sheets for 5 to 60 sec at 700° C., which is a temperature lower than the Ac1 temperatures of all the steel sheets, in a non-oxidizing atmosphere was performed. Then, second cold rolling (skin pass rolling) was performed at a cumulative rolling reduction of 9% until a sheet thickness reached 0.35 mm.

The Ac1 temperatures of all examples shown in Table 7 were about 850° C.

After the second cold rolling (skin pass rolling) was performed, workability was evaluated by the same method as in the first example.

Final annealing was not performed in this example.

Stress relief annealing for holding the steel sheets for 2 hours at 800° C. was performed after a test for evaluating workability. After the stress relief annealing was performed, magnetic flux densities B50 and iron losses W10/400 were measured by the same methods as in the first example. The Ar1 temperatures and the Ac1 temperatures were measured by the same methods as in the first example.

TABLE 7

| | Chemical composition (mass %) Remainder iron and impurities | | | | | | | | | | | | |
|---|---|---|---|---|---|---|---|---|---|---|---|---|---|
| No. | C | Si | sol-Al | S | N | Mn | Ni | Co | Pt | Pb | Cu | Au | Left side of Expression |
| 401 | 0.0008 | 2.49 | 0.010 | 0.0021 | 0.0019 | 3.14 | — | — | — | — | — | — | 0.64 |
| 402 | 0.0011 | 2.50 | 0.009 | 0.0022 | 0.0020 | — | 3.13 | — | — | — | — | — | 0.62 |
| 403 | 0.0011 | 2.51 | 0.009 | 0.0019 | 0.0019 | — | — | 3.14 | — | — | — | — | 0.62 |
| 404 | 0.0009 | 2.51 | 0.011 | 0.0021 | 0.0021 | — | — | — | 3.12 | — | — | — | 0.60 |
| 405 | 0.0012 | 2.52 | 0.010 | 0.0021 | 0.0022 | — | — | — | — | 3.13 | — | — | 0.61 |
| 406 | 0.0011 | 2.49 | 0.012 | 0.0020 | 0.0021 | — | — | — | — | — | 3.11 | — | 0.61 |
| 407 | 0.0011 | 2.51 | 0.009 | 0.0022 | 0.0018 | — | — | — | — | — | — | 3.11 | 0.59 |
| 408 | 0.0011 | 2.51 | 0.010 | 0.0020 | 0.0019 | 3.11 | — | — | — | — | — | — | 0.58 |
| 409 | 0.0011 | 2.48 | 0.010 | 0.0019 | 0.0020 | 3.11 | — | — | — | — | — | — | 0.61 |
| 410 | 0.0008 | 2.51 | 0.013 | 0.0019 | 0.0019 | 3.12 | — | — | — | — | — | — | 0.59 |
| 411 | 0.0009 | 2.52 | 0.011 | 0.0018 | 0.0020 | 3.39 | — | — | — | — | — | — | 0.86 |
| 412 | 0.0009 | 2.48 | 0.012 | 0.0020 | 0.0019 | 3.69 | — | — | — | — | — | — | 1.19 |

TABLE 8

| | Hot rolling | Punching test | | | Magnetic characteristics after annealing performed for 2 hours at 800° C. | | | |
|---|---|---|---|---|---|---|---|---|
| No. | Winding temperature (° C.) | Length of long side (mm) | Length of short side (mm) | Lift distance (μm) | B50 in 45° direction (T) | B50 on whole circumferential average (T) | W10/400 (W/kg) | Note |
| 401 | 500 | 49.997 | 2.999 | 185 | 1.812 | 1.677 | 15.17 | Example of invention |
| 402 | 500 | 49.997 | 2.999 | 188 | 1.811 | 1.676 | 15.10 | Example of invention |
| 403 | 500 | 49.997 | 2.999 | 186 | 1.810 | 1.679 | 15.11 | Example of invention |
| 404 | 500 | 49.997 | 2.999 | 197 | 1.810 | 1.679 | 15.11 | Example of invention |
| 405 | 500 | 49.997 | 2.999 | 179 | 1.808 | 1.679 | 15.11 | Example of invention |
| 406 | 500 | 49.997 | 2.999 | 190 | 1.810 | 1.677 | 15.13 | Example of invention |
| 407 | 500 | 49.997 | 2.999 | 194 | 1.809 | 1.676 | 15.12 | Example of invention |
| 408 | 500 | 49.997 | 2.999 | 176 | 1.812 | 1.678 | 15.15 | Example of invention |
| 409 | <u>600</u> | 49.997 | 2.999 | 199 | 1.788 | 1.647 | 16.53 | Comparative Example |
| 410 | <u>200</u> | 49.997 | 2.999 | 168 | 1.792 | 1.650 | 16.38 | Comparative Example |
| 411 | 500 | 49.997 | 2.999 | 170 | 1.805 | 1.674 | 14.66 | Example of invention |
| 412 | 500 | 49.997 | 2.999 | 198 | 1.798 | 1.669 | 14.13 | Example of invention |

Underlines shown in Table 8 represent conditions out of the scope of the invention. Nos. 401 to 408 and Nos. 411 and 412, which were the examples of the invention, had good dimensional accuracy after punching but had slight lift distances. Further, Nos. 401 to 408 and Nos. 411 and 412 had excellent magnetic characteristics both in the 450 direction and on the whole circumferential average (high magnetic flux densities B50 and low iron losses W10/400).

On the other hand, since the winding temperatures of Nos. 409 and 410, which were comparative examples, were not appropriate, the magnetic flux densities thereof deteriorated and the iron losses thereof were increased.

The invention claimed is:

1. A method for manufacturing a non-oriented electrical steel sheet, the method comprising:
a step of obtaining a hot-rolled steel sheet by performing hot rolling on a steel material and winding the steel material in a temperature range higher than 250° C. and equal to or lower than 550° C., the steel material having a chemical composition that contains, by mass %, 0.0100% or less of C, 1.50 to 4.00% of Si, 0.0001 to 1.000% of sol.Al, 0.0100% or less of S, 0.0100% or less of N, a total content of Mn, Ni, Co, Pt, Pb, Cu, and Au is 2.50 to 5.00%, 0.000 to 0.400% of Sn, 0.000 to 0.400% of Sb, 0.000 to 0.400% of P, and a total content of Mg, Ca, Sr, Ba, Ce, La, Nd, Pr, Zn, and Cd is 0.0000 to 0.0100%, with a balance of Fe and impurities, and satisfies the following Expression (1) in a case where, by mass %, a Mn content is denoted by (Mn), a Ni content is denoted by (Ni), a Co content is denoted by (Co), a Pt content is denoted by (Pt), a Pb content is denoted by (Pb), a Cu content is denoted by (Cu), an Au content is denoted by (Au), a Si content is denoted by (Si), and a sol.Al content is denoted by (sol.Al);

a step of performing first cold rolling on the hot-rolled steel sheet;

a step of performing process annealing after the first cold rolling;

a step of performing second cold rolling after the process annealing; and a step of performing any one or both of final annealing and stress relief annealing after the second cold rolling to produce the non-oriented electrical steel sheet, wherein the non-oriented electrical steel sheet has a magnetic flux density B50 on a whole circumferential average in the sheet surface of 1.650 T or more, wherein a final pass of finish rolling during the hot rolling is performed in a temperature range equal to or higher than an Ar1 temperature, the steel sheet is held for 2 hours or less in a temperature range lower than an Ac1 temperature in the final annealing, and the steel sheet is held for 1200 sec or more in a temperature range equal to or higher than 600° C. and lower than the Ac1 temperature in the stress relief annealing, wherein cold rolling is performed at a cumulative rolling reduction of 80 to 92% in the step of performing the first cold rolling, and cold rolling is performed at a cumulative rolling reduction of 5 to 25% in the step of performing the second cold rolling,

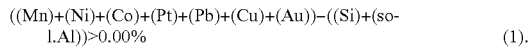
$$((Mn)+(Ni)+(Co)+(Pt)+(Pb)+(Cu)+(Au))-((Si)+(sol.Al))>0.00\% \qquad (1).$$

2. The method for manufacturing a non-oriented electrical steel sheet according to claim 1,
wherein the steel material contains one or more selected from the group consisting of, by mass %, 0.020 to 0.400% of Sn, 0.020 to 0.400% of Sb, 0.020 to 0.400% of P, and a total content of Mg, Ca, Sr, Ba, Ce, La, Nd, Pr, Zn, and Cd is 0.0005 to 0.0100%.

3. The method for manufacturing a non-oriented electrical steel sheet according to claim 1,
wherein the steel sheet is held for 10 to 1200 sec in a temperature range equal to or higher than 600° C. and lower than the Ac1 temperature in the final annealing.

4. The method for manufacturing a non-oriented electrical steel sheet according to claim 1,
wherein the steel sheet is held for 1 hour or more in a temperature range equal to or higher than 750° C. and lower than the Ac1 temperature in the stress relief annealing.

5. The method for manufacturing a non-oriented electrical steel sheet according to claim 1,
wherein the process annealing is performed in a temperature range lower than the Ac1 temperature.

6. The method for manufacturing a non-oriented electrical steel sheet according to claim 1,
wherein both the final annealing and the stress relief annealing are performed.

7. The method for manufacturing a non-oriented electrical steel sheet according to claim 2,
wherein the steel sheet is held for 10 to 1200 sec in a temperature range equal to or higher than 600° C. and lower than the Ac1 temperature in the final annealing.

8. The method for manufacturing a non-oriented electrical steel sheet according to claim 2,
wherein the steel sheet is held for 1 hour or more in a temperature range equal to or higher than 750° C. and lower than the Ac1 temperature in the stress relief annealing.

9. The method for manufacturing a non-oriented electrical steel sheet according to claim 2,
wherein the process annealing is performed in a temperature range lower than the Ac1 temperature.

10. The method for manufacturing a non-oriented electrical steel sheet according to claim 2,
wherein both the final annealing and the stress relief annealing are performed.

* * * * *